(12) United States Patent
Saiguchi et al.

(10) Patent No.: US 7,413,246 B2
(45) Date of Patent: Aug. 19, 2008

(54) SAFETY DEVICE FOR MOTOR VEHICLE

(75) Inventors: Ryoji Saiguchi, Shiga (JP); Sami Al-Samarae, Berlin (DE); Mohammed Daher, Berlin (DE)

(73) Assignees: Takata Corporation, Tokyo (JP); Takata-Petri AG, Aschaffenburg (DE)

( * ) Notice: Subject to any disclaimer, the term of this patent is extended or adjusted under 35 U.S.C. 154(b) by 215 days.

(21) Appl. No.: 11/031,688

(22) Filed: Jan. 10, 2005

(65) Prior Publication Data
US 2005/0200171 A1 Sep. 15, 2005

Related U.S. Application Data

(63) Continuation of application No. PCT/DE2003/002383, filed on Jul. 9, 2003.

(30) Foreign Application Priority Data
Jul. 10, 2002 (DE) ................. 102 31 794

(51) Int. Cl.
*B60N 2/42* (2006.01)
(52) U.S. Cl. ............. 297/216.12; 297/216.11; 297/216.1; 297/484
(58) Field of Classification Search ........ 297/216.1, 297/484, 464, 463.1–463, 284.11, 216.12; 280/730.1, 733
See application file for complete search history.

(56) References Cited

U.S. PATENT DOCUMENTS 3,550,953 A * 12/1970 Neale .................. 297/312
4,225,178 A     9/1980 Takada
5,462,332 A * 10/1995 Payne et al. ............. 297/216.1
5,556,160 A     9/1996 Mikami
5,597,205 A *  1/1997 Glance et al. .......... 297/362.14
5,735,574 A *  4/1998 Serber .................. 297/284.4
5,908,219 A *  6/1999 Bohmler ............... 297/216.1
6,050,635 A     4/2000 Pajon et al.
6,302,481 B1 * 10/2001 Swann et al. .......... 297/216.18
6,352,312 B1 *  3/2002 Rees .................... 297/470
6,382,718 B1 *  5/2002 Janke et al. .......... 297/216.16
6,386,631 B1 *  5/2002 Masuda et al. ......... 297/216.1
6,402,237 B1    6/2002 Adomeit et al.
6,450,573 B1 *  9/2002 Yamaguchi et al. ..... 297/216.1
6,604,599 B2    8/2003 Yamaguchi et al.
6,629,575 B2 * 10/2003 Nikolov ................ 180/282
6,672,667 B1 *  1/2004 Park .................... 297/344.1

(Continued)

FOREIGN PATENT DOCUMENTS
DE      36 31 881 A    4/1988

(Continued)

*Primary Examiner*—David R Dunn
*Assistant Examiner*—Erika Garrett
(74) *Attorney, Agent, or Firm*—Foley & Lardner LLP

(57) ABSTRACT

A safety device for a motor vehicle seat comprising a seat surface which extends along a longitudinal direction of the seat, a securing element assigned to the seat surface and a drive device which is operatively connected to the securing element and is activated in a crash situation, in order to move the securing element out of a starting position, without changing the spatial position thereof, so that the seat surface and the securing element oppose the forward displacement of the pelvis of a person sitting on the seat surface in the longitudinal direction of the seat.

38 Claims, 13 Drawing Sheets

U.S. PATENT DOCUMENTS

| | | | |
|---|---|---|---|
| 6,715,788 B2 * | 4/2004 | Saiguchi et al. | 280/730.1 |
| 6,913,319 B2 * | 7/2005 | Yamaguchi et al. | 297/468 |
| 2004/0055806 A1 | 3/2004 | Po | |

FOREIGN PATENT DOCUMENTS

| | | |
|---|---|---|
| DE | 42 12 254 C1 | 4/1993 |
| DE | 195 04 975 A1 | 8/1996 |
| DE | 296 10 078 U1 | 11/1996 |
| DE | 197 31 761 A1 | 1/1999 |
| DE | 198 59 197 A1 | 7/1999 |
| DE | 100 11 819 A1 | 11/2000 |
| DE | 199 19 697 A1 | 11/2000 |
| DE | 199 38 697 A1 | 2/2001 |
| DE | 100 65 464 A1 | 8/2001 |
| EP | 0 965 479 A2 | 12/1999 |
| EP | 1 049 603 B1 | 10/2000 |
| EP | 1 067 015 A1 | 1/2001 |
| EP | 1 199 214 A2 | 4/2002 |
| EP | 1 245 437 A1 | 10/2002 |
| FR | 2 747 081 A1 | 10/1997 |
| GB | 1 348 873 | 3/1974 |
| GB | 2 323 336 A | 9/1998 |
| WO | WO 01/19641 A1 | 3/2001 |
| WO | WO0145985 * | 6/2001 |

* cited by examiner

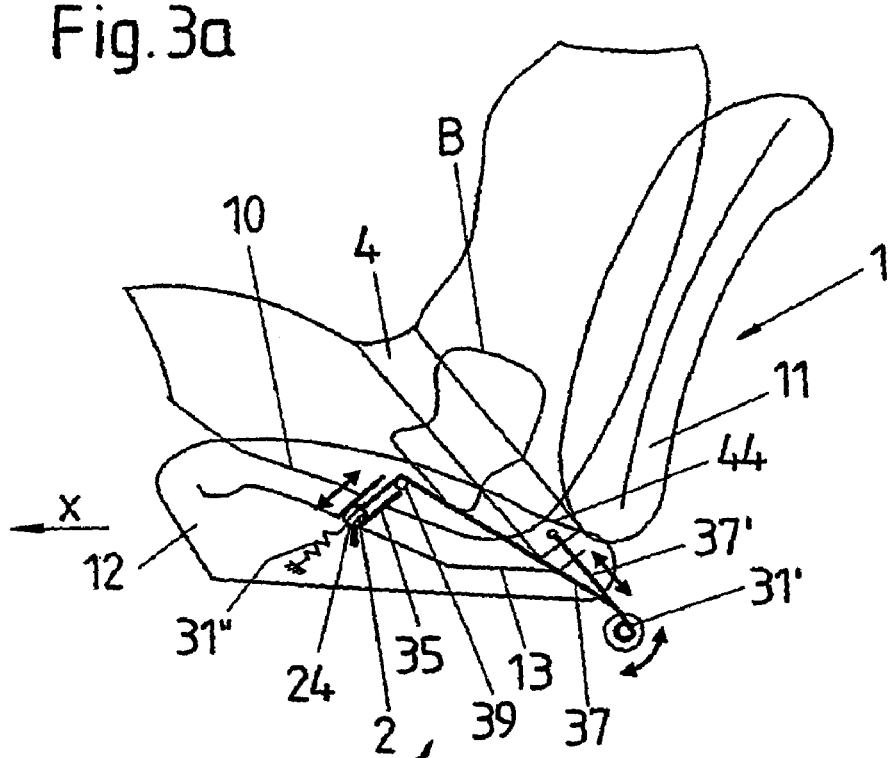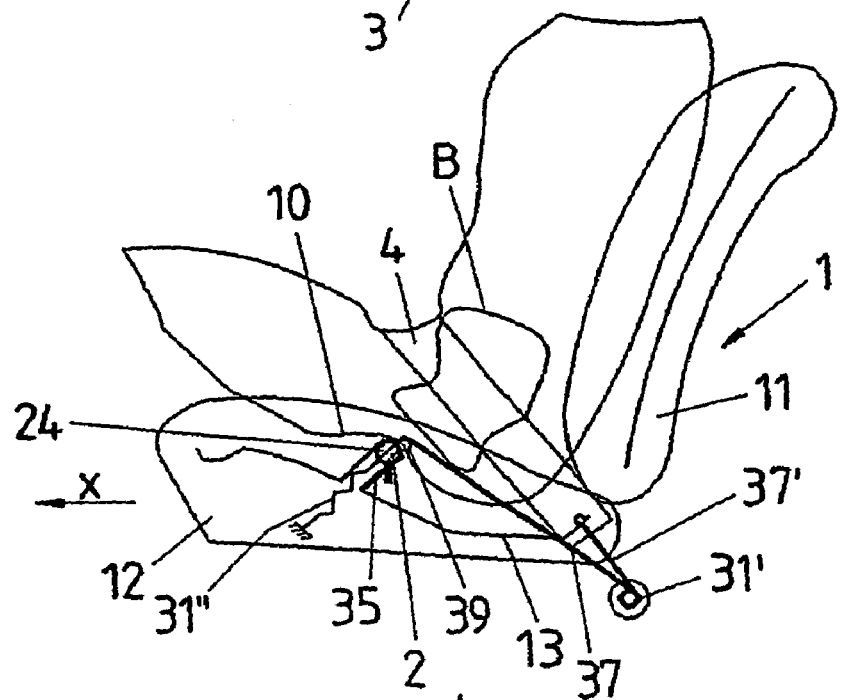

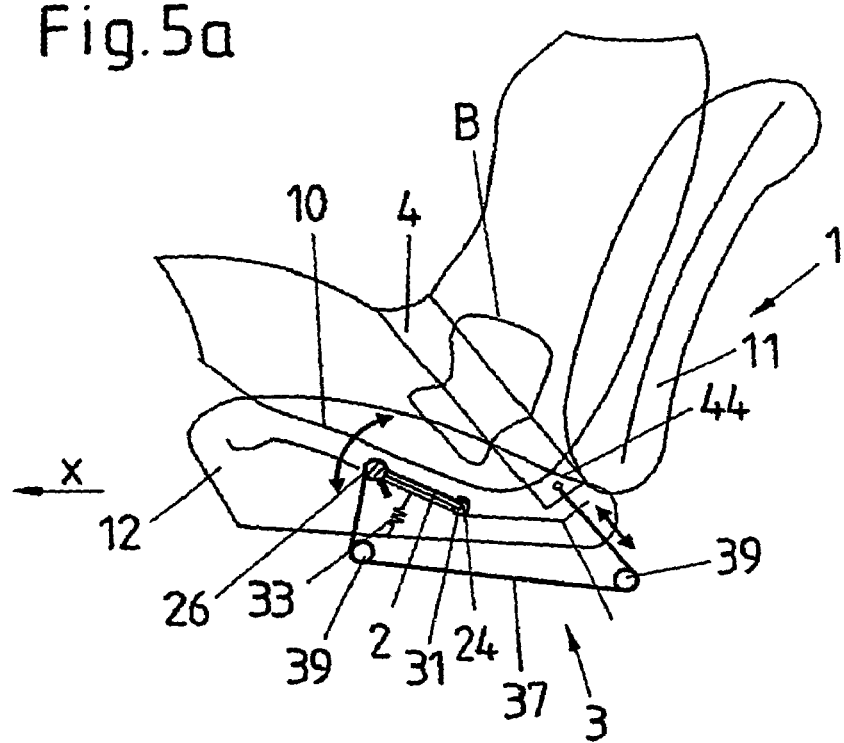
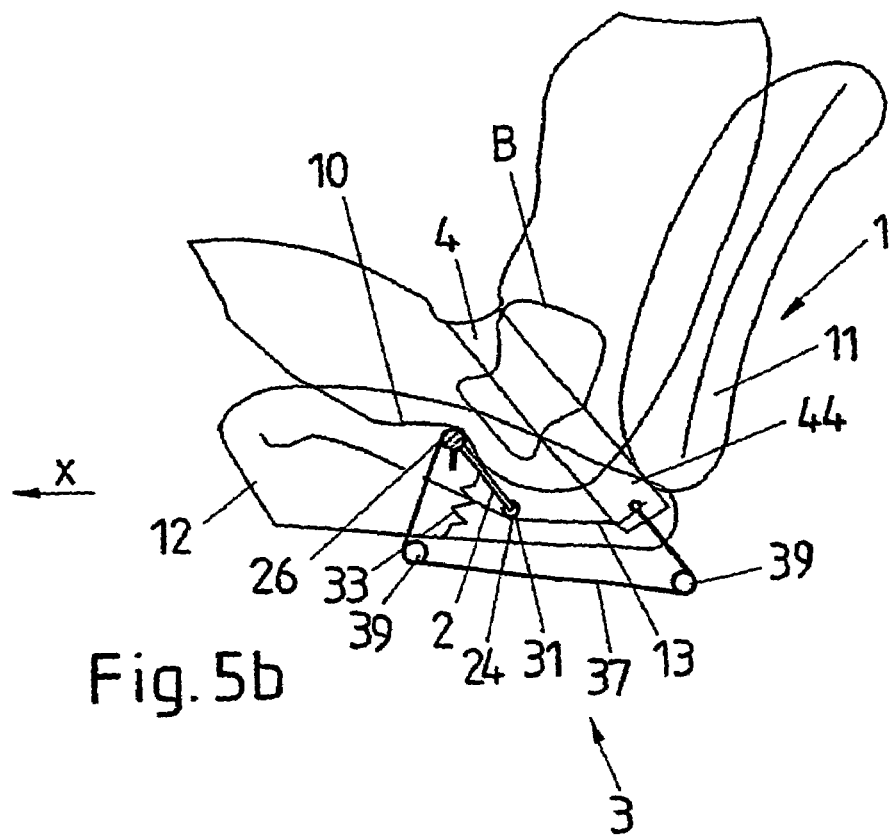

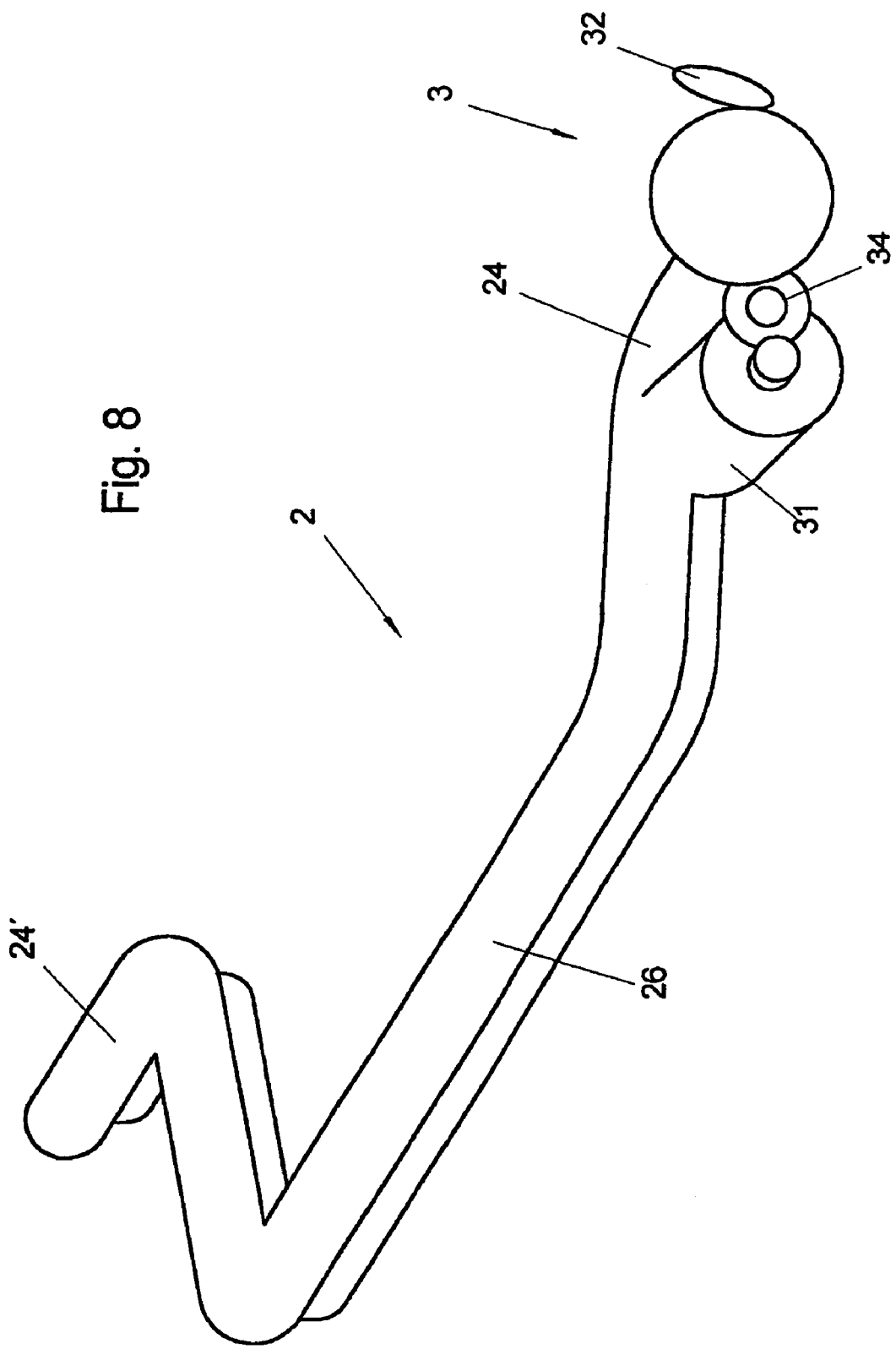

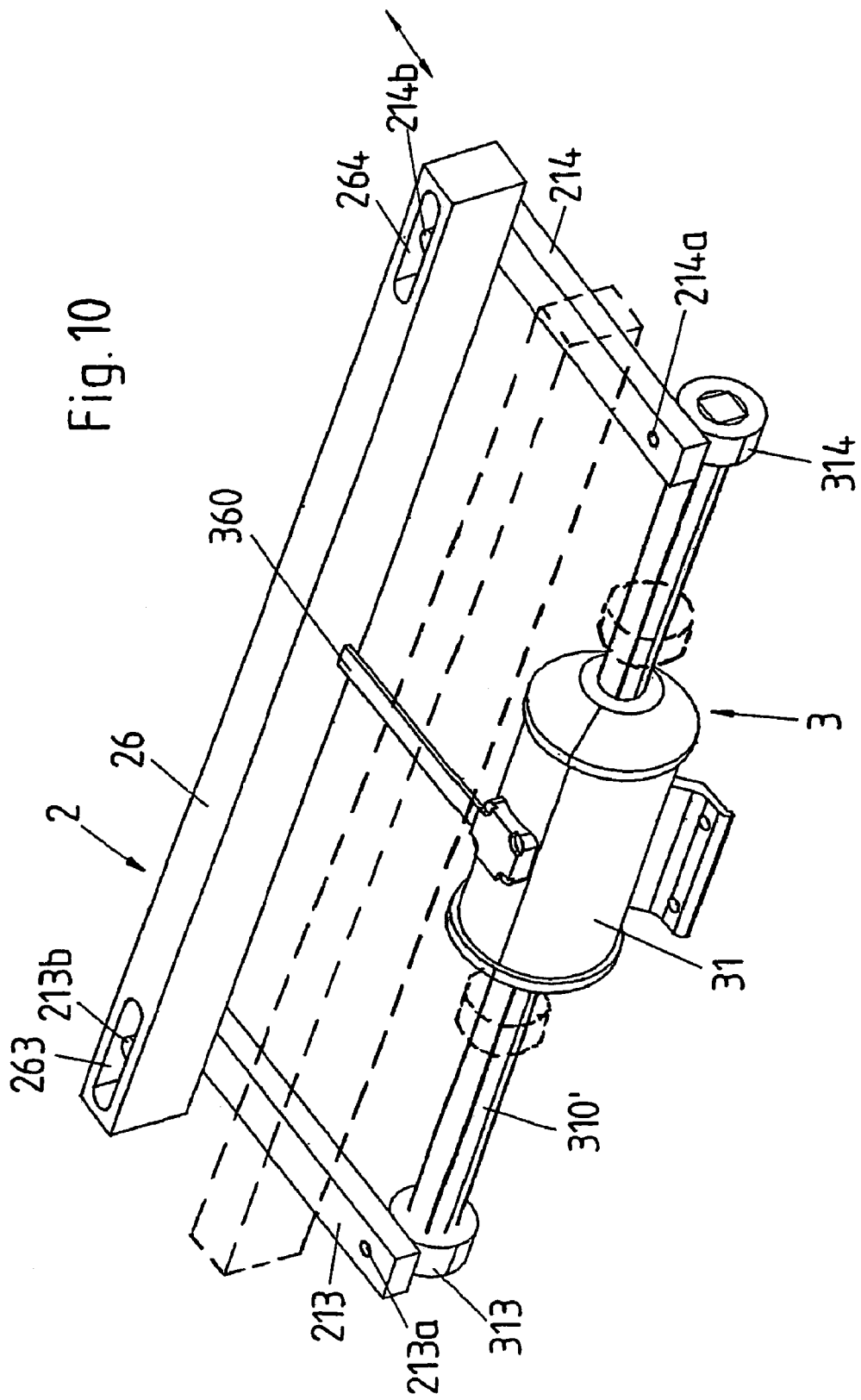

SAFETY DEVICE FOR MOTOR VEHICLE

CROSS-REFERENCE TO RELATED APPLICATIONS

This is a continuation of international application PCT/DE2003/002383, which has an international filing date of Jul. 9, 2003; the International Application was not published in English, but was published in German as WO 2004/007237.

BACKGROUND OF THE INVENTION

The invention relates generally to a safety device for a motor vehicle seat. A typical safety device of this type has a seat surface which is typically formed by a seat cushion and on which a person using the corresponding motor vehicle seat can sit, and a movably mounted (displaceable) securing element which is assigned to the seat surface and can be moved by a drive device, which can be activated in a crash situation, out of a starting position so that, together with the seat surface, it opposes the forward displacement of the pelvis of a person sitting on the seat surface in the longitudinal direction of the seat. In this case, the seat surface extends along a longitudinal direction of the seat which, in the state in which the seat is fitted into a motor vehicle, corresponds, for example, essentially to the longitudinal axis of the vehicle (direction of travel of a motor vehicle).

The seat surface forms, on the one hand, a component of the motor vehicle seat to which the safety device is assigned; however, it simultaneously also forms a component of the safety device itself, since it is intended, together with the securing element, to limit the forward displacement of the pelvis of a person sitting on the seat surface. To this end, the securing element is brought closer to the seat surface (of the seat cushion) by means of the drive device, with it being possible, if appropriate, also for a certain deformation of the seat surface to occur. However, the spatial position of the seat surface as a whole is not changed in this case (e.g. by pivoting the seat surface).

The interaction of the securing element, which is moved out of its starting position, and the seat surface is intended to prevent a person who is buckled up by means of a seat belt of the corresponding vehicle seat from plunging under the seat belt, specifically the lap belt thereof, in a crash situation-induced forward displacement. This effect is also referred to as "submarining".

In order to oppose the forward displacement of the pelvis of a person sitting on the seat surface in the longitudinal direction of the seat in a crash situation, a series of specific solutions is known from the prior art. A common feature of all of these solutions is that a securing element in the region of the seat surface of the motor vehicle seat is moved with respect to the seat surface in or shortly before a crash situation so that the securing element and seat surface limit the forward movement of the pelvis of a vehicle occupant in the longitudinal direction of the seat or only permit it within a controlled region.

A motor vehicle seat of this type is disclosed, for example, in DE 100 11 819 A1 (incorporated by reference herein). The securing element there is moved in the direction of the seat surface of the motor vehicle seat by means of a pyrotechnic drive in a crash situation.

Not all collisions of motor vehicles in road traffic totally write off the vehicle. There therefore exist a multiplicity of traffic accidents with a collision, in the course of which the movement of the securing element out of the starting position is activated and the vehicle is damaged to a degree making repair of the damage which has occurred to the vehicle to still be worthwhile. Furthermore, it is conceivable for an imminent but ultimately averted collision to be detected by a pre-crash sensor present in the vehicle and for the movement of the securing element out of the starting position to be activated. In such cases, the motor vehicle seat known from the abovementioned publication has the disadvantage that, in particular, the pyrotechnic drive device of the securing element of the motor vehicle seat has to be replaced when the vehicle is being repaired. This results in additional repair costs.

SUMMARY OF THE INVENTION

It is an object of at least one embodiment of the present invention to provide a simply constructed safety device for a motor vehicle seat, which device opposes the forward displacement of the pelvis of a person sitting on the motor vehicle seat in a crash situation in a cost-effective manner without having the abovementioned disadvantages.

According to one embodiment of the present invention a safety device is provided. The safety device includes a seat surface which extends along a longitudinal direction of the seat, a securing element assigned to the seat surface and a drive device which is operatively connected to the securing element and is activated in a crash situation, in order to move the securing element out of a starting position. The securing element acts on the seat surface without changing the spatial position thereof, so that the seat surface and the securing element oppose the forward displacement of the pelvis of a person sitting on the seat surface in the longitudinal direction of the seat. The drive device has a mechanism for returning the securing element into the starting position so that after the securing element is returned into the starting position, a new movement of the securing element in a new crash situation is ensured, and the drive device comprises a motor device which, in a crash situation serves for moving the securing element out of the starting position and/or which serves for returning the securing element into the starting position.

Provision is made according to one embodiment of the invention for the drive device of the safety device to have a mechanisms for returning the securing element into the starting position and for the drive device, after returning the securing element into the starting position, to ensure a new movement of the securing element in a new crash situation.

According to another embodiment of the invention a motor vehicle seat is therefore provided, in which that movement of the securing element which is triggered in a crash situation and is also referred to below as the adjusting movement is reversible. That is to say, the movement of the securing element out of the starting position can be reversed after a first crash situation and, in addition, the safety device again provides the movement of the securing element out of the starting position in a second crash situation. This has the advantage of it easily being possible, when required and without structural elements of the drive device of the securing element being replaced, to return the motor vehicle seat together with the securing element and the drive device back into the original state again after a crash situation.

Crash situation is understood to mean both an actually occurring collision and also an imminent, but then averted collision of a motor vehicle. One embodiment of the invention may be employed in motor vehicles whose safety system has a sensor for detecting imminent collisions (pre-crash sensor).

The safety device according to one embodiment of the invention is suitable in particular for the purpose of, when a person is buckled up on the vehicle seat by means of a seat belt, opposing a sliding of the person's pelvis in the longitudinal direction of the seat under a section of the seat belt that is arranged in the region of the pelvis.

According to another embodiment of the invention, the drive device preferably has a releasable catch which blocks a return movement of the securing element into the starting position. In this case, the releasable catch has the function of preventing forces acting on the securing element during a crash situation from moving the securing element back in the direction of the starting position. After the crash situation, the catch can be released in order to move the securing element back again into the starting position by means of the drive device.

In yet another embodiment of the device, the mechanism for returning the securing element into the starting position comprise a spring device. This spring device is arranged so that the securing element subjects the spring device to a force during the adjusting movement of the securing element. After the crash situation, the catch on the securing element can be released, so that the spring force of the spring device moves the securing element back into the starting position. In this embodiment of the motor vehicle seat, the drive device preferably has a motor device for the adjusting movement of the securing element in a crash situation. Suitable motors for a motor device are all types of electric motors, in particular even electric motors for producing a linear movement.

In still another embodiment of the invention, the mechanism for guiding the securing element back into the starting position are designed in the form of a motor device and the drive device has a spring element for the adjusting movement of the securing element in a crash situation. In this case, the spring element is prestressed in the starting position of the securing element and is secured by a retaining device. In a crash situation, the spring element is released by the retaining device, and the spring force of the spring element is converted into the adjusting movement of the securing element. After the crash situation, the securing element can be guided back into the starting position by the activation of the motor device, with the spring element again being prestressed and secured by means of the retaining device.

According to another embodiment of the invention, the motor device of the drive device serves both for moving the securing element in the adjusting movement out of the starting position in a crash situation and also for guiding the securing element back into the starting position after the crash situation. The motor device therefore serves both as a mechanism for returning the securing element and as a mechanism for the adjusting movement of the securing element. An additional retaining device as in the second variant of the motor vehicle seat is not required.

In one embodiment of the invention, the drive device preferably has a mechanism for the transmission and, if appropriate, stepping-up of force between the motor device and the securing element. The mechanism may be, for example, a toothed mechanism (including rack mechanisms and toothed belt mechanisms), a spindle mechanism, a lever mechanism, a belt mechanism or a mechanism using a flexible traction mechanism.

The securing element extends essentially perpendicularly to the longitudinal direction of the seat preferably below an upholstery of the seat surface. In particular, the securing element can be arranged here on a seat shell of the seat part. As a result, the securing element can easily be moved in the direction of the seat surface in a crash situation, so that the seat surface and securing element form a barrier which is effective essentially along the direction of extent of the securing element and opposes the forward displacement of the pelvis of a person sitting on the motor vehicle seat along the entire width of the seat surface.

To this end, according to one embodiment of the invention, the securing element preferably has a displaceable section which, during the adjusting movement of the securing element, is brought into such a position that it limits (together with the seat surface) the forward displacement of the pelvis of a person sitting on the corresponding seat surface.

Furthermore, in another embodiment of the invention, the securing element has at least one section, for example in the form of an end section, via which the securing element is guided along its direction of movement and on which, if appropriate, the drive device can also act.

In still another embodiment of the invention, the adjusting movement of the securing element in a crash situation may be designed as a translation, as a rotation or as a combination of a translation with a rotation. The common feature of all three variants of the adjusting movement is that the securing element is moved in the direction of the pelvis of the person sitting on the seat surface of the motor vehicle seat.

According to yet another embodiment of the present invention, the securing element is moved in a purely translatory manner in a crash situation. In this case, the securing element is of essentially strand-shaped design. The motor vehicle seat has guide structures which are arranged lying opposite the side regions of said seat and which accommodate the two end sections of the strand-shaped securing element and serve for the guidance of the translatory adjusting movement. A motor device is preferably arranged on each end section of the strand-shaped securing element. This motor device serves exclusively for realizing the adjusting movement; a spring device is then provided for the return movement into the starting position.

In another embodiment of the present invention, a spring element realizes the adjusting movement and the motor device serves for returning the securing element. In the third variant, the motor device serves both for realizing the adjusting movement and for returning the securing element into the starting position.

Further, according to another embodiment of the present invention, a rotary adjusting movement of the securing element is provided. In this case, the securing element is of bow-shaped design. A rectilinear pivoting section, in particular, can be provided between the two end sections of the bow-shaped securing element. The bow-shaped securing element is coupled pivotably to the side regions of the vehicle seat by both end sections in order to enable the rotational adjusting movement of the securing element in a crash situation. During the adjusting movement, the rectilinear pivoting region of the securing element acts on the seat surface so that a barrier which opposes the forward displacement of the pelvis of a person sitting on the motor vehicle seat is formed on the seat surface. In this case, a motor device is arranged in the region of at least one end section of the bow-shaped securing element. This motor device serves, as described previously for the translatory adjusting movement, for realizing the adjusting movement of the securing element and/or for returning the securing element into the starting position. For the variants in which the motor device serves only for adjusting or returning the securing element, a spring element or a spring device is correspondingly provided for the other movement in each case.

According to another embodiment of the present invention, the motor vehicle seat is wherein the drive device has a strand-shaped traction mechanism and the securing element is operatively connected to the motor device by means of the strand-shaped traction mechanism. In this case, the strand-shaped traction mechanism serves for the transmission of the force exerted by the motor device to the securing element. In particular, a Bowden cable or a plastic strand having little inherent stretch can be used as the strand-shaped traction mechanism.

Owing to the geometrical installation conditions on the motor vehicle seat, another embodiment of the current invention guides the strand-shaped traction mechanism between the securing element and motor device via at least one deflecting element. For example, a deflecting pulley can be used as the deflecting element.

Another embodiment of the invention has a second strand-shaped traction mechanism which is arranged between the motor device and an end section of a lap belt, which is provided on the motor vehicle seat, so that, in a crash situation, the motor device brings about a tensioning of the lap belt toward the seat surface during the movement of the securing element. This embodiment integrates the function of a belt tensioner in a simple and cost-effective manner.

The strand-shaped traction mechanism of the embodiments of the motor vehicle seat can either be wound up or moved in a translatory manner by means of the motor device in order to realize the desired adjusting and/or return movement of the securing element. When a second strand-shaped traction mechanism is used, the rotational or translatory movement of the strand-shaped traction mechanism additionally serves for tensioning the lap belt. A combination of a rotational and translatory movement of the strand-shaped traction mechanism is likewise conceivable for obtaining the abovementioned effects.

A further embodiment of the present invention is wherein the strand-shaped traction mechanism is fastened by its first end to the securing element and by its second end, via at least one deflecting element, to an end section of a lap belt, which is provided on the motor vehicle seat. In this case, the movement of the securing element in a crash situation causes the lap belt to be simultaneously tensioned toward the seat surface via the strand-shaped traction mechanism. The function of a belt tensioner can thereby be integrated into the motor vehicle seat in a simple and cost-effective manner.

Preferably, it is advantageous for the securing element to be of plastically deformable design. In this case, it acts, in a crash situation, in interaction with the pelvis of the person sitting on the seat surface, as an energy-absorbing element. In particular, it is advantageous if the plastic deformation of the securing element takes place essentially along the longitudinal direction of the seat in a crash situation with the aim of the pelvis moving in a controlled and braked manner.

Further, the drive device of the motor vehicle seat can be activated preferably by signals of a crash sensor in a motor vehicle. The motor vehicle seat can therefore easily be integrated into the safety system of a motor vehicle. In this case, the drive motor of the drive device can be arranged, on the one hand, centrally between two longitudinal sides of the seat surface of the corresponding motor vehicle seat, or alternatively two drive motors can be provided for moving the securing element, which motors are arranged on in each case one of the two longitudinal sides of the seat surface.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims and the accompanying exemplary embodiments shown in the drawings, which are briefly described below.

FIG. 3a shows a schematic view of a longitudinal section of a third embodiment of the motor vehicle seat with a translatorily movable securing element in the starting position and with belt tensioning.

FIG. 3b shows the motor vehicle seat from FIG. 3a with the securing element released and in the adjusting movement.

FIG. 5a shows a schematic view of a longitudinal section of a fifth embodiment of the motor vehicle seat with a rotational movable securing element in the starting position and with belt tensioning.

FIG. 5b shows the motor vehicle seat from FIG. 5a with the securing element released and in the adjusting movement.

FIG. 8 shows a perspective view of a bow-shaped securing element of energy-absorbing design.

FIG. 10 shows a second specific embodiment of a securing element adjustable by means of a drive device, in a perspective illustration.

DETAILED DESCRIPTION

Figure 1A:
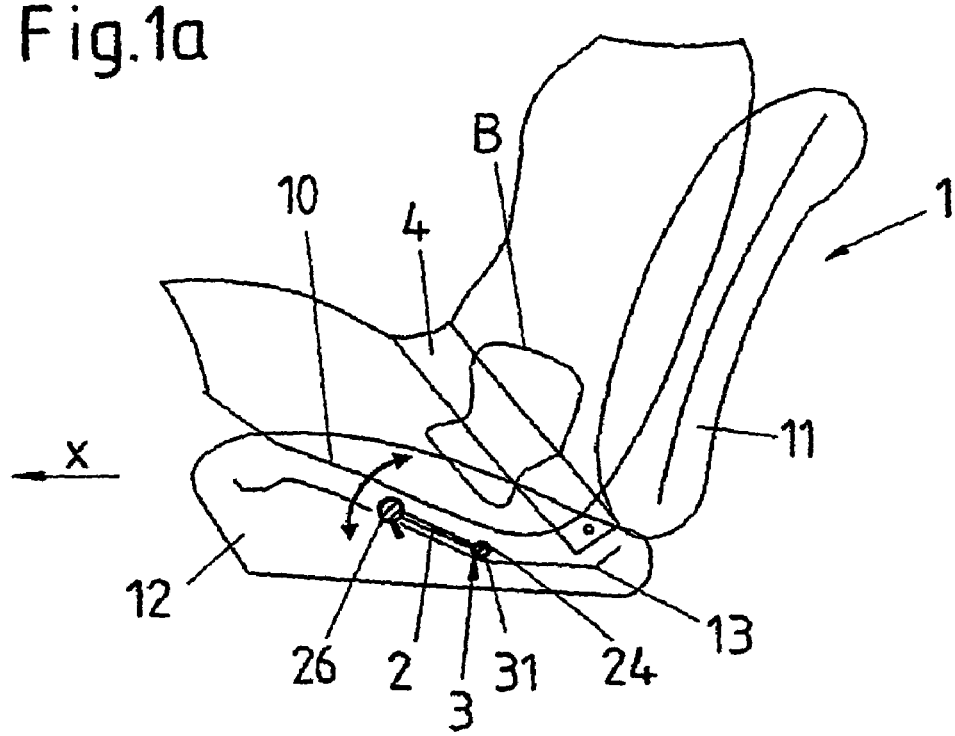
FIG. 1a is a schematic view of a longitudinal section of a first embodiment of the motor vehicle seat with a rotational movable securing element in the starting position.

FIG. 1a shows a schematic view of a longitudinal section along the longitudinal direction X of a seat of a first embodiment of a motor vehicle seat 1 together with a safety device. The motor vehicle seat 1 has in a known manner a backrest part 11 and a seat part 12 with a seat surface 10 arranged on the upper side of the seat part 12. The seat part 12 comprises a seat shell 13 on which upholstery is provided. The seat surface 10 is arranged in turn on the surface of the upholstery of the body of a person sitting on the motor vehicle seat, FIG. 1a shows the region from the knees to the neck, the thigh region and the pelvic region coming to lie on the seat surface 10 of the seat part 12. The pelvis B of the seated person is shown in a schematized manner below a lap belt section 4 of a seat belt.

A bow-shaped securing element 2 is arranged between the seat shell 13 and the seat surface 10 of the seat part 12 to form the safety device. A displaceable section 26, which extends essentially perpendicularly to the plane of the longitudinal section and is in the form of a pivoting section, extends between the end regions 24, 24' of the securing element 2, of which, because of the view of the longitudinal section, only one end section 24 can be seen in FIG. 1a. The bow-shaped securing element 2 is coupled pivotably to the side structure and/or seat shell 13 of the motor vehicle seat 1 by its end regions 24, 24'.

Figure 1B:
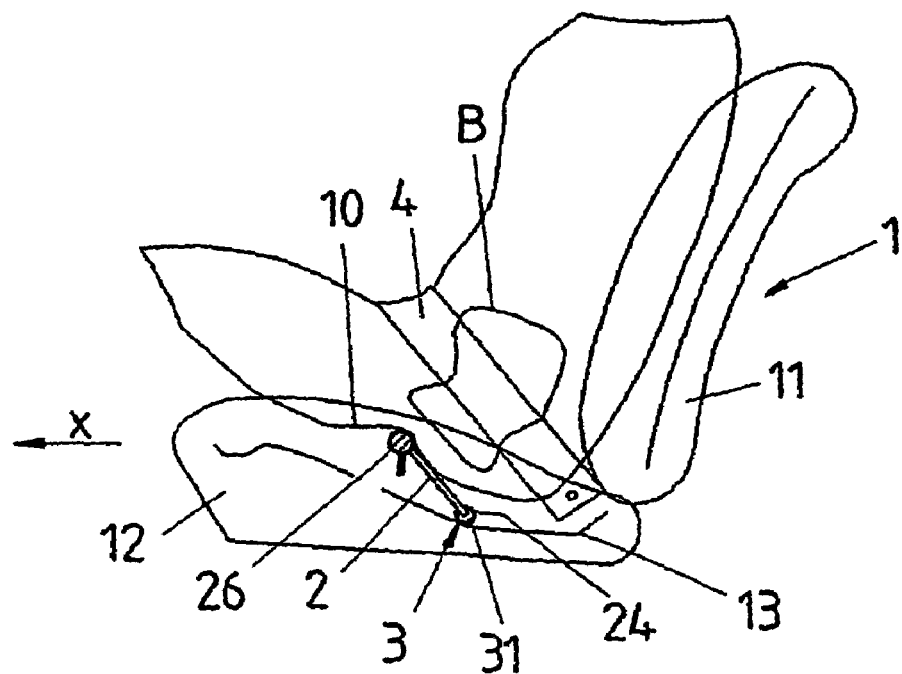
FIG. 1b shows the motor vehicle seat from FIG. 1a with the securing element released and in an adjusting movement.

FIG. 1b shows the same sectional view as FIG. 1a, with the same elements of the motor vehicle seat being provided with the same reference numbers. The securing element 2 has a drive device 3 for generating a rotational movement of the displaceable section 26 in the direction of the seat surface 10 and of the pelvis B of a person sitting on the motor vehicle seat 1 (rotational adjusting movement). The drive device 3 is designed in the form of a motor device 31 arranged on at least one of the end regions 24, 24' of the bow-shaped securing element 2. This motor device 31 simultaneously forms the means enabling the securing element 2 to be returned into the starting position after a crash situation.

However, it would likewise be conceivable for the motor device 31 shown in FIGS. 1a and 1b to serve exclusively for the adjusting movement or for the return of the securing element 2. A spring device operatively connected to the securing element 2 would then have to be present in each case, said spring device serving for the generation of the adjusting movement or the return movement and being prestressed in each case by the countermovement of the securing element 2 that is driven by the motor device 31.

The adjusting movement of the securing element 2 causes the formation of a barrier which runs transversely to the longitudinal direction X of the seat, extends essentially along the entire width of the seat surface 10 and is brought into direct contact with the pelvis with the positioning in between of the upholstery, which is greatly compressed in this region. The compressed upholstery between the securing element 2 and the seat surface 10 reduces the "clearance" between the pelvis B and the securing element 2. Thus, in the crash situation, the securing element 2, which is preferably designed in a manner such that it can be deformed horizontally in the X-direction and such that it is vertically rigid, can convert the energy of the occupant introduced via the pelvis B directly into work of deformation. A uniform, small loading of the pelvis B and other body parts is thereby realized. In addition, the loadings of the vehicle seat 1 are also reduced as a result.

In this case, the force required for the plastic deformation is configured so that the forward movement of the pelvis B of a seated person is braked, in a crash situation, along the longitudinal direction X of the seat on a section controlled by the deformation of the securing element 2. As a result, the forces acting on the pelvis B and the spinal column of a seated person in the crash situation can be reduced. The securing element 2 thereby acts as an energy-absorbing element.

Figure 2A:
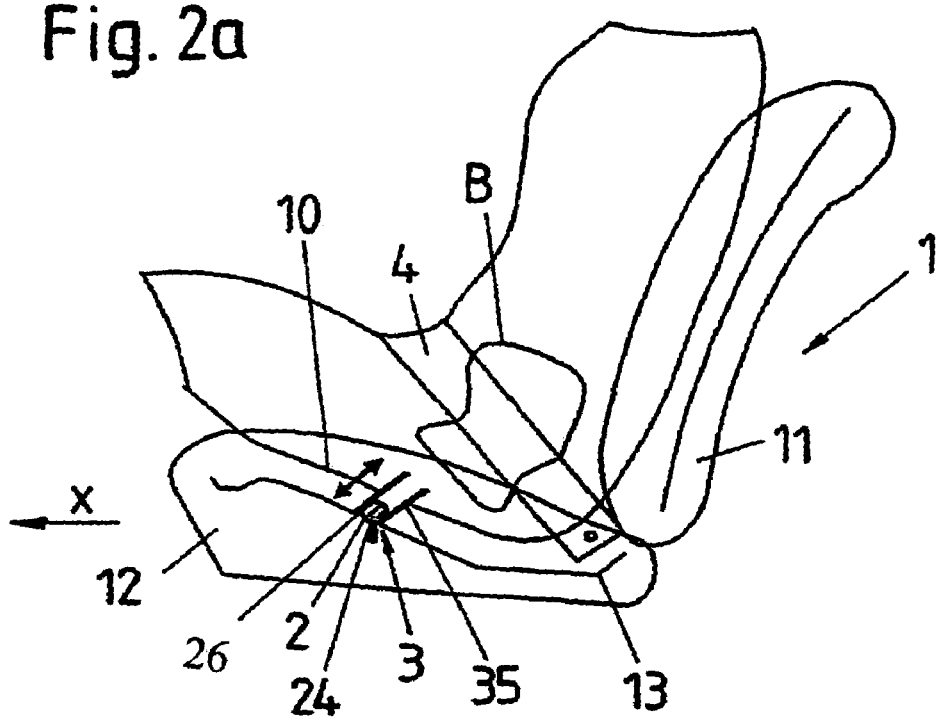
FIG. 2a shows a schematic view of a longitudinal section of a second embodiment of the motor vehicle seat with a translatorily movable securing element in the starting position.

FIG. 2a shows a second embodiment of the motor vehicle seat 1 in the same schematic view of the longitudinal section as FIG. 1a. In contrast to the first embodiment, this motor vehicle seat 1 has a translatorily movable securing element 2. In this case, the securing element 2, which extends in an essentially strand-shaped manner and is arranged essentially perpendicularly to the plane of the longitudinal section, is arranged in guide structures 35 with its end sections 24 in each case in the two side regions of the seat part 12. The guide structures 35 here may be designed in the manner of rails.

Precisely as in the above-described embodiment of the motor vehicle seat 1, there exist three basic variants in respect of the design of the drive device 3.

Figure 2B:
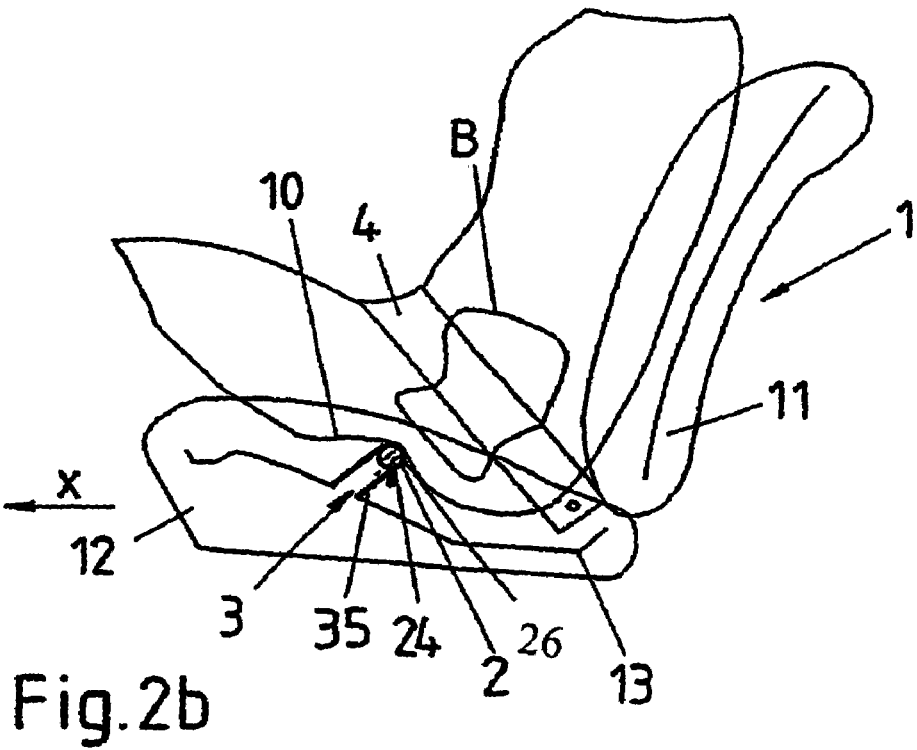
FIG. 2b shows the motor vehicle seat from FIG. 2a with the securing element released and in the adjusting movement.

In a first variant, the drive device 3, as illustrated in FIG. 2b, has, on each side of the motor vehicle seat, a motor device 31 which drives both the adjusting movement and the return movement of the securing element 2.

In the second variant, the motor device 31 is provided exclusively for the adjusting movement, with the return movement of the securing element 2 being realized by means of a spring device (not illustrated in FIG. 2a or 2b). The spring device is then prestressed during the adjusting movement of the securing element 2.

In the third variant, the motor device 31 is provided for the return movement of the securing element 2, with it being possible for the adjusting movement to be realized by means of a spring element (not illustrated in FIG. 2a or 2b). A retaining device which can be released in the crash situation is required for this spring element. As motor device 31, use can be made, in particular, of a solenoid which, together with the guide structures 35, provides the required linear movement of the securing element 2.

FIGS. 3a to 7b show five further embodiments of the motor vehicle seat which combine the principle of a returnable securing element 2 with a device for tensioning the lap belt of a seat belt arranged on the motor vehicle seat.

A common feature of all five embodiments illustrated is that the drive device 3 comprises at least one strand-shaped traction mechanism 37. This strand-shaped traction mechanism 37 is operatively connected to the motor device 31, 31' so that, during the adjusting movement of the securing element 2 in a crash situation, that end section 44 of a seat belt 4 which is arranged on the pelvis B is simultaneously tensioned toward the seat surface 10.

FIG. 3a shows a first exemplary embodiment of a motor vehicle seat 1 according to the invention with an integrated belt-tensioning device in an illustration of the longitudinal section parallel to the longitudinal direction X of the seat. As in the vehicle seat 1 shown in FIGS. 2a and 2b, a translatorily movable securing element 2 is provided. In a departure from the motor vehicle seat 1 from FIG. 2a, the motor device 31' is arranged in the region below the backrest part 11 and is operatively connected to the securing element 2 via a first strand-shaped traction mechanism 37. To this end, the strand-shaped traction mechanism 37 is fastened by its one end to the securing element and is guided to the motor device 31 via a deflecting means designed as a deflecting pulley 39.

In addition, the drive device 3 has a second strand-shaped traction mechanism 37'. This second strand-shaped traction mechanism 37' is fastened by its one end to the motor device 31' and by its second end to the end section 44 of the seat belt 4, which runs over the pelvis B of a seated person, and therefore produces the operative connection between the motor device 31' and the seat belt 4.

Furthermore, a mechansim which is designed as a spring element 31" and is intended for returning the securing element 2 into the starting position is arranged on the securing element 2. This spring element 31" is, as illustrated in FIG. 3b, pretensioned during the adjusting movement of the securing element 2, which movement is driven by the motor device 31', so that the spring force of the spring element 31" suffices to move the securing element 2 back again into the starting position. In order to produce the adjusting movement of the securing element 2, the motor device 31' winds up part of the strand-shaped first traction mechanism 37. At the same time, the motor device 31' partially winds up the second strand-shaped traction mechanism 37', with the result that the end section 44 of the seat belt 4 is pulled toward the seat surface. The tensioning of the seat belt 4 therefore supports the action (already described) of the adjusting movement of the securing element 2 and therefore also opposes an uncontrolled forward displacement of the pelvis B of a seated person in a crash situation.

Figure 4A:
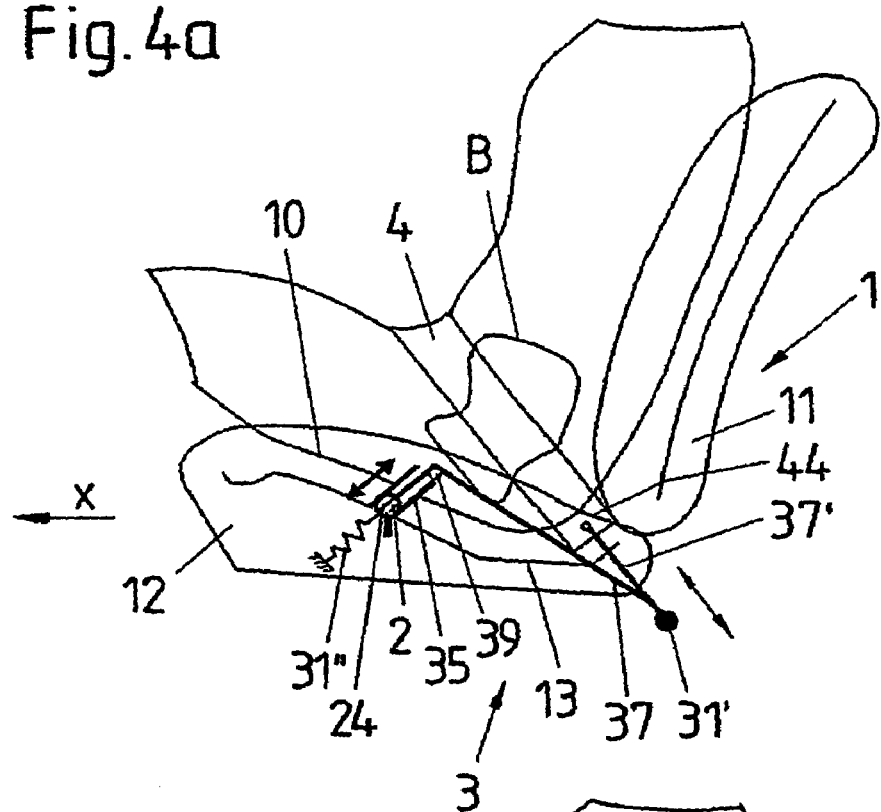
FIG. 4a shows a schematic view of a longitudinal section of a fourth embodiment of the motor vehicle seat with a translatorily movable securing element in the starting position and with belt tensioning.
Figure 4B:
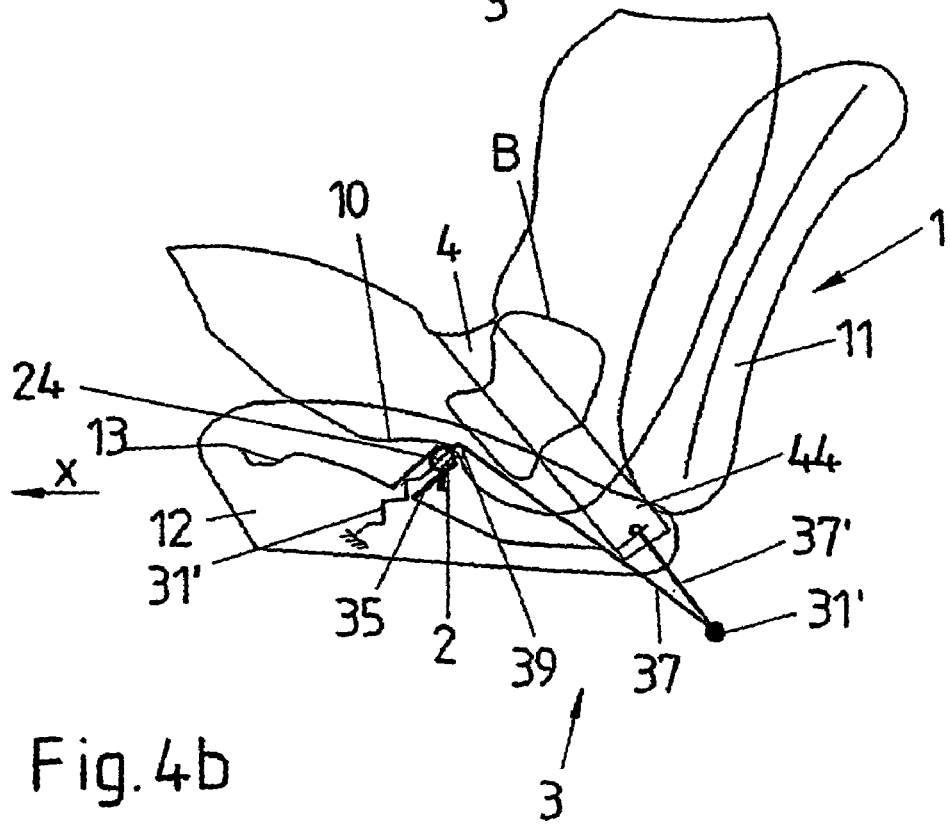
FIG. 4b shows the motor vehicle seat from FIG. 4a with the securing element released and in the adjusting movement.

FIGS. 4a and 4b illustrate a second embodiment of a motor vehicle seat 1 according to the invention with an integrated belt tensioner that is very similar to the first embodiment from FIGS. 3a and 3b. The sole difference is that the motor device 31' does not realize the adjusting movement and the belt tensioning by winding up the strand-shaped traction mechanism 37 and 37', but rather by a translatory movement of those end sections of the strand-shaped traction mechanism 37, 37' which are assigned to the motor device 31'. To produce the linear movement, use can be made, in particular, of a correspondingly designed solenoid as the motor device 31'.

FIGS. 5a and 5b illustrate a third embodiment of a motor vehicle seat according to the invention with an integrated belt tensioner. As in the motor vehicle seat illustrated in FIGS. 1a and 1b, a rotary movable, bow-shaped securing element 2 is illustrated. In addition, the drive device 3 has a spring element 33 for the adjusting movement of the securing element 2. In the starting position of the securing element 2 that is illustrated in FIG. 5a, the spring element 33 is prestressed with respect to the securing element 2. In a crash situation, a retaining device (not illustrated in FIG. 5a) is released, so that the rotary adjusting movement of the securing element 2, which movement is driven by the spring element 33, can take place in the direction of the seat surface 10, as illustrated in FIG. 5b. The motor device 31, which is arranged on an articulated end section of the securing element 2, serves for returning the rotary movable securing element.

A strand-shaped traction mechanism 37 is arranged on the displaceable section 26 of the bow-shaped securing element 2 and is operatively connected to the end section 44 of a lap belt 4 via deflecting mechanism 39 so that the rotary adjusting movement of the securing element 2 inevitably causes a tensioning of the lap belt 4 toward the seat surface 10. In the embodiment illustrated in FIGS. 5a and 5b, two deflecting means designed as deflecting pulleys 39 are arranged for this purpose below the seat shell 13 essentially along the longitudinal direction X of the seat.

In the in FIGS. 5a and 5b, it would likewise be conceivable to provide, as a mechanism for returning the securing element 2, a spring device which is prestressed during the adjusting movement of the securing element 2, which movement is driven by the motor device 31, counter to the adjusting movement. If a spring element is provided for the adjusting movement or for the return movement, the motor device 31 could likewise be provided at any desired point along the strand-shaped traction mechanism 37, in particular integrated together with the deflecting means 39.

Figure 6A:
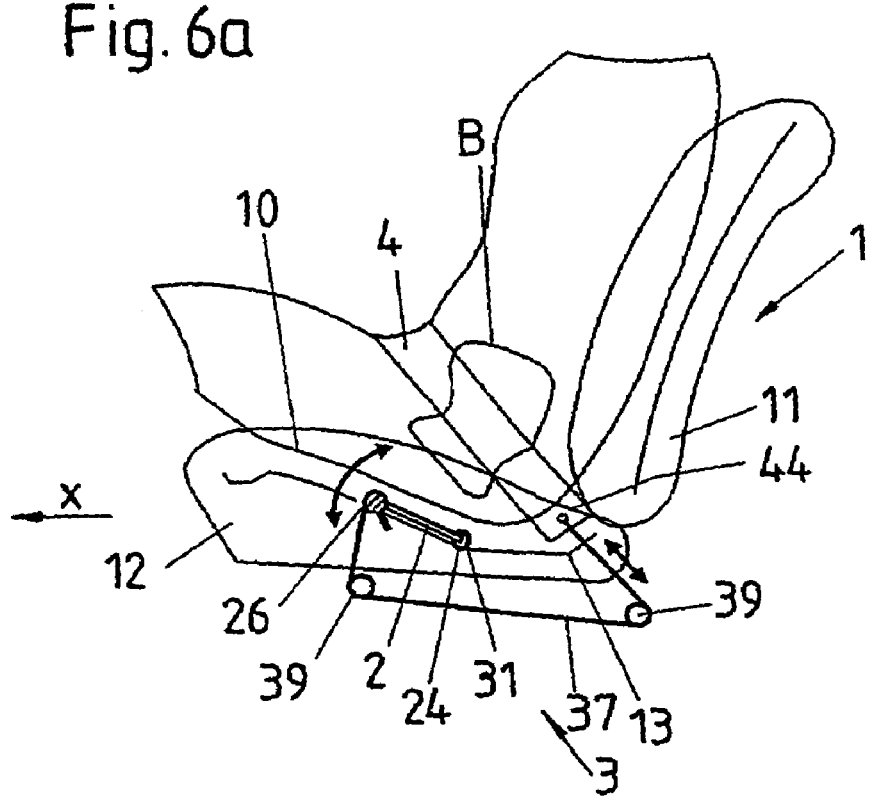
FIG. 6a shows a schematic view of a longitudinal section of a sixth embodiment of the motor vehicle seat with a rotational movable securing element in the starting position and with belt tensioning.
Figure 6B:
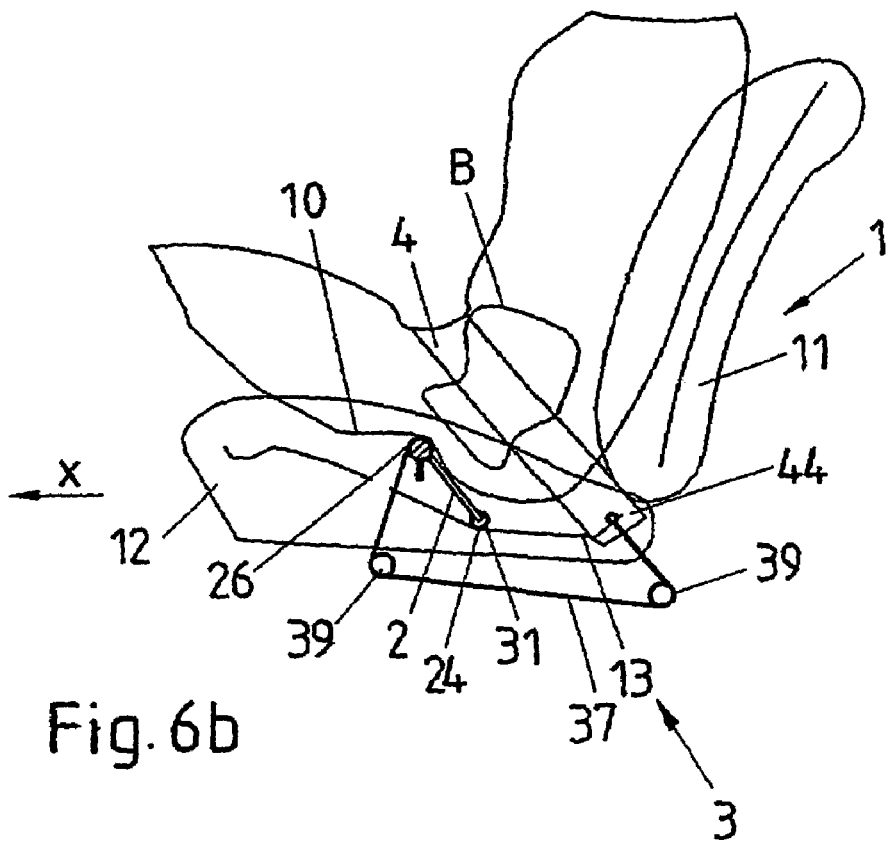
FIG. 6b shows the motor vehicle seat from FIG. 6a with the securing element released and in the adjusting movement.

Starting from the embodiment shown in FIGS. 5a and 5b, a further variant in which the motor device 31 is provided both for the adjusting movement and for the return movement of the securing element 2 is illustrated in FIGS. 6a and 6b as a fourth embodiment of the motor vehicle seat 1 according to the invention.

Figure 7A:
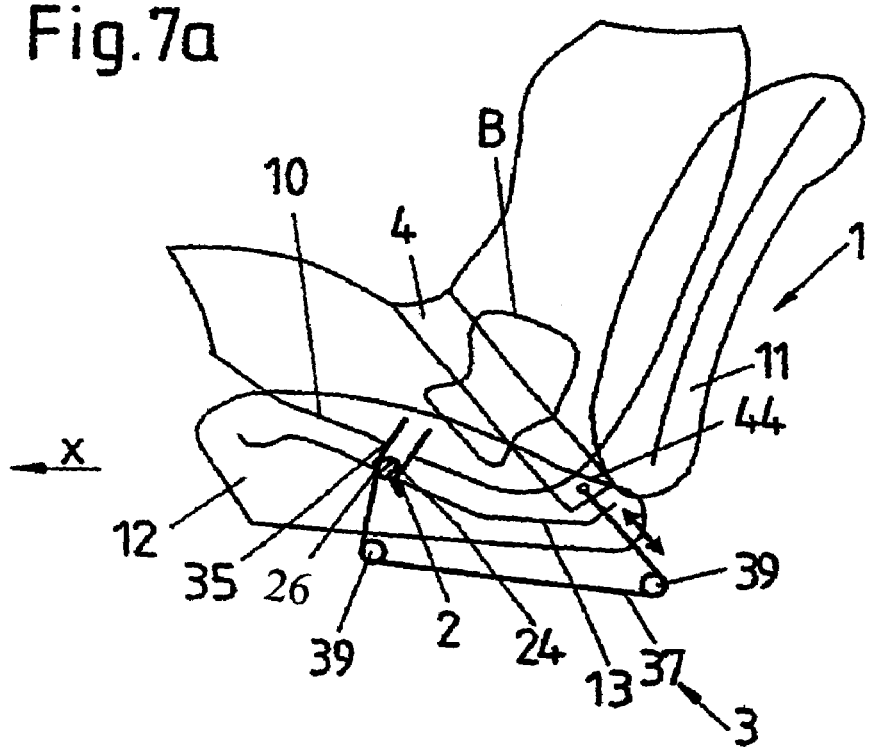
FIG. 7a shows a schematic view of a longitudinal section of a seventh embodiment of the motor vehicle seat with a rotational movable securing element in the starting position and with belt tensioning.
Figure 7B:
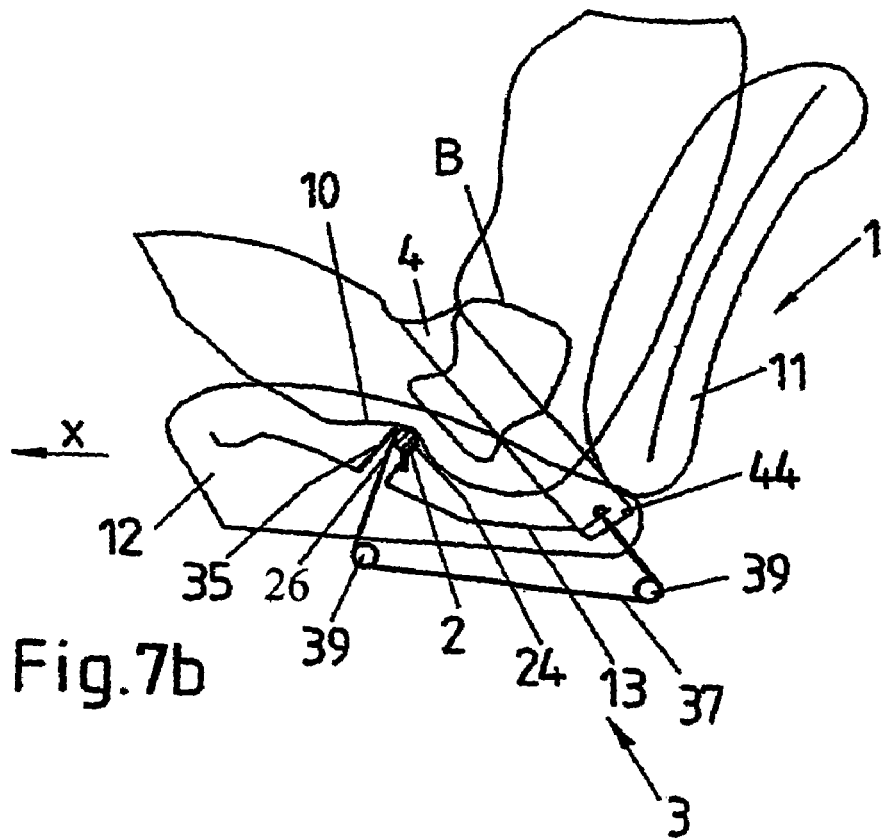
FIG. 7b shows the motor vehicle seat from FIG. 7a with the securing element released and in the adjusting movement.

FIGS. 7a and 7b illustrate a fifth embodiment of a motor vehicle seat 1 according to the invention with an integrated belt tensioner. This motor vehicle seat 1 has a translatorily movable securing element 2 in accordance with the description for FIGS. 2a and 2b. Otherwise, the construction of the drive device 3 corresponds to a strand-shaped traction mechanism 37 of the illustration shown in FIGS. 6a and 6b. The statements made in respect of the figures mentioned therefore apply correspondingly to the embodiment shown in FIGS. 7a and 7b.

FIG. 8 shows a schematic perspective view of a bow-shaped securing element 2 which can be used for the embodiments of the motor vehicle seat 1 according to the invention that are shown in FIGS. 1a and 1b and 5a to 6b.

A rectilinear displaceable section 26 in the form of a pivoting section extends between the two end sections 24, 24' of the bow-shaped securing element 2. The two end sections 24, 24' are angled away from the displaceable section 26 so that they form a pivot axis. The securing element 2 can therefore be coupled pivotably to the end sections 24, 24' in a simple manner, so that the displaceable section 26 can be moved in the direction of the seat surface 10 in the seat part 12 of a motor vehicle seat 1.

A motor device 31 having a mechanism 34 is arranged in the region of one end section 24 in order to transmit a torque to the securing element 2 and in order to pivot about the pivot axis. The mechanism 34 is furthermore operatively connected to a catch 32 which blocks a return movement of the securing element 2 during the adjusting movement. The operative connection of the catch 32 with the mechanism 34 can be released if required in order to return the securing element 2 into the starting position, for example by means of the motor device 31 or by means of a spring element (not illustrated in FIG. 8).

Five exemplary embodiments for a specific refinement of the securing element 2 and of the associated drive device 3, which are arranged in each case on a seat part 12 surrounding a seat shell 13, are described below with reference to FIGS. 9a to 13b. As can be seen with reference to FIGS. 9a and 9b, a drive motor 31 is arranged on the seat shell 13 centrally between those two longitudinal sides 12a, 12b of the seat part 12 that extend in the longitudinal direction X of the seat, a motor shaft 310 of said drive motor protruding in each case toward both longitudinal sides 12a, 12b perpendicularly to the longitudinal axis X of the vehicle and being provided at its end with a toothed wheel 311 or 312. Each of these toothed wheels 311, 312, which can be driven by the drive motor 31, are in engagement with the toothing of an associated rack 211, 212, which extends in the longitudinal direction X of the seat parallel to a longitudinal side 12a, 12b of the seat part 12. A tube forming the displaceable section 26 of the securing element 2 is held at one end of the two racks 211, 212 and can be displaced along the longitudinal axis X of the vehicle via the racks 211, 212 by actuation of the drive device 3, as indicated in FIG. 9b using the double arrow. Depending on the direction of rotation of the drive motor 31, in this case, on the one hand, a displacement of the securing element 2 out of a starting position is possible in order to oppose the forward displacement of the pelvis of a person sitting on the corresponding vehicle seat, or, alternatively, a return of the securing element 2 into the starting position is possible.

Figure 9A:
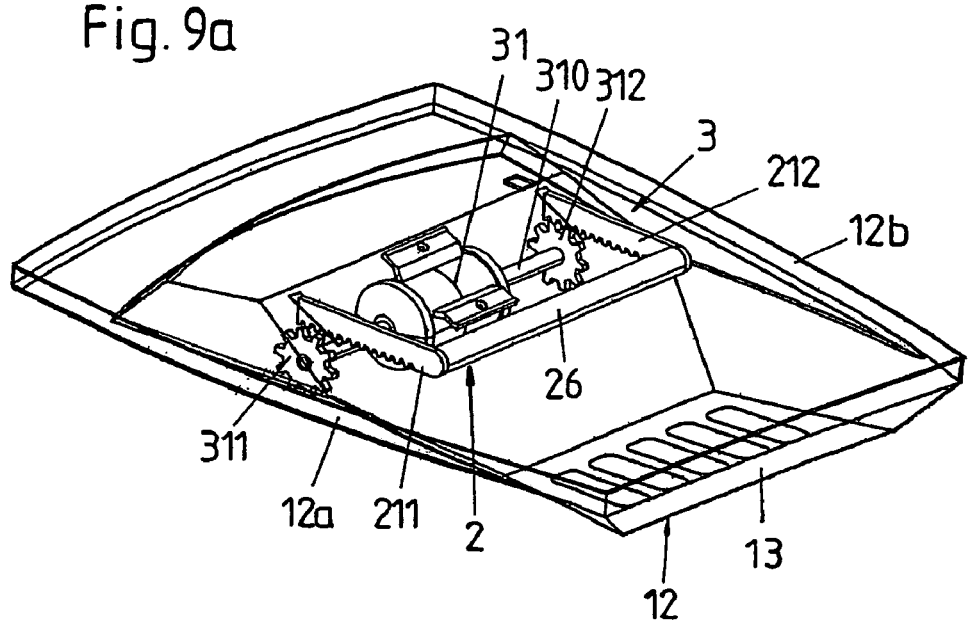
FIG. 9a shows a perspective view of a seat part with a first specific embodiment of a securing element adjustable by means of a drive device.
Figure 9B:
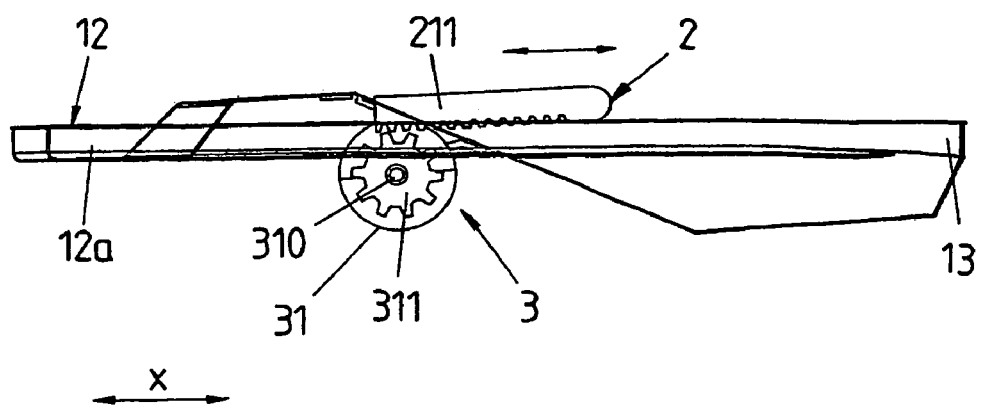
FIG. 9b shows a side view of a seat part with a first specific embodiment of a securing element adjustable by means of a drive device.

In FIGS. 9a and 9b, the securing element 2 is illustrated in its crash-induced forwardly displaced state from which it can be returned again into the starting position by actuation of the drive motor 3.

FIG. 10 illustrates a securing element 2 and an associated drive device 3 together with a drive motor 31, which is to be arranged centrally, without the associated seat part. As in the exemplary embodiment explained with reference to FIGS. 9a and 9b, a drive shaft 310' emerges from the drive motor 31 in two mutually opposed directions, but in the present case those sections of the drive shaft 310' which are situated outside the motor housing are provided with an external thread. On both sides of the drive motor 31, a respective bushing 313, 314, which is provided with an internal thread, is provided on these sections of the drive shaft 10 which are provided with an external thread, said bushings being arranged on the drive shaft 310' in a rotationally fixed but longitudinally displaceable manner. A connecting rod 213 or 214 is coupled pivotably to each of the bushings 313, 314 at a point of articulation 213a, 214a so that the connecting rods 213, 214 can rotate in their common plane freely about their particular axis of articulation 213a, 214a. The two connecting rods 213, 214 extend to the displaceable section 26 of the securing element 2, which section is formed by a transverse rod, and are in engagement with said displaceable section via pins 213b, 214b engaging in each case in a longitudinal guide (elongated hole) 263, 264.

The front displaceable section 26 of the securing element 2 is additionally guided in an elongated guide element 360 protruding in the longitudinal direction from the housing of the drive motor 31.

FIG. 10 shows the front displaceable section 26 of the securing element 2 after a translatory movement (along the direction of the double arrow in FIG. 10) away from the drive motor 31 (adjusting movement) into a crash-induced forwardly displaced position in which it opposes the slipping through of the pelvis of a person sitting on the corresponding motor vehicle. By actuation of the drive motor 31 (with a reversal of the direction of rotation of the motor on the basis of the preceding forward displacement of the front displaceable section 26 of the securing element 2), the securing element 2 can be guided back again into the starting position, which is illustrated in FIG. 10 by dashed lines. The transmission of the displacing force of the drive motor 31 to the front displaceable section 26 of the securing element 2 takes place here via the bushings 313, 314, which are mounted in a longitudinally displaceable manner on the drive shaft 310' and move inward in the direction of the drive motor 31, and via the connecting rods 213, 214, which are coupled to them in an articulated manner. The elongated guide element 360 protruding from the housing of the drive motor 31 serves here for the defined longitudinal guidance of the front displaceable section 26 of the securing element 2.

Figure 11A:
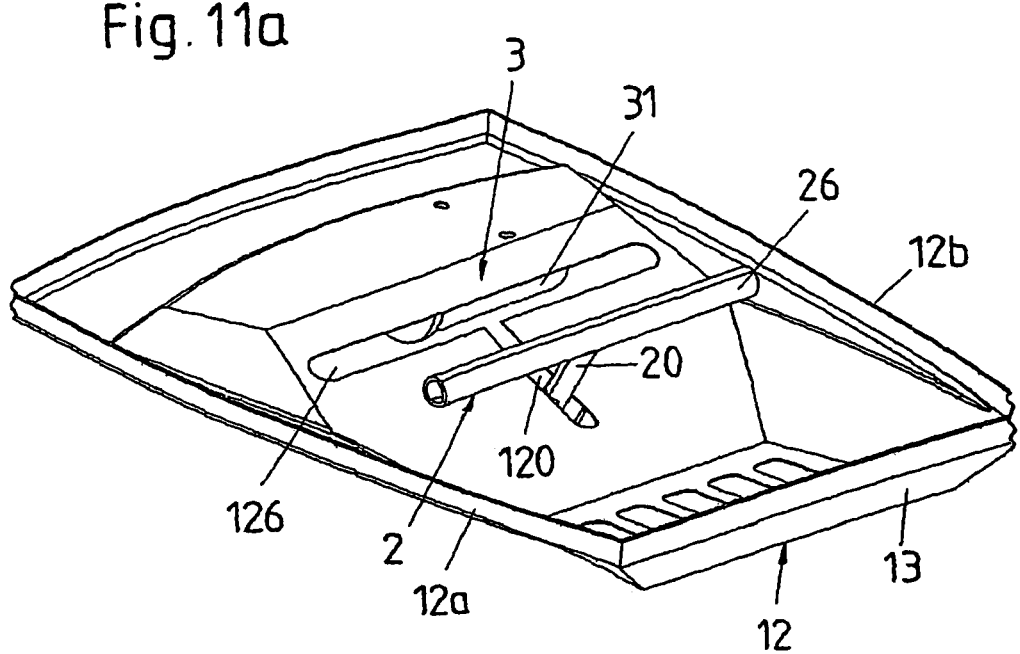
FIG. 11a shows a perspective view of a seat part with a securing element adjustable by a drive device.
Figure 11B:
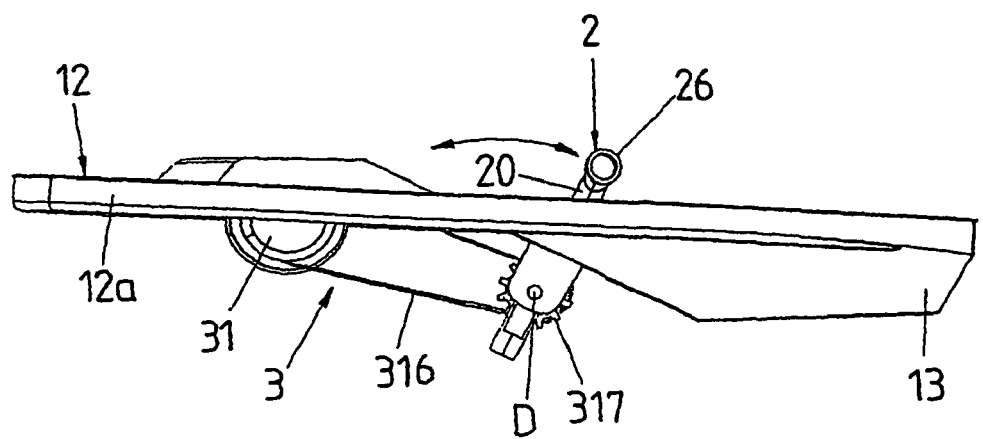
FIG. 11b shows a side view of a seat part with a securing element adjustable by a drive device.

In the exemplary embodiment illustrated in FIGS. 11a and 11b, the relevant displaceable section 26 of the securing element 2 can be displaced by pivoting it about an axis of rotation D, the displaceable section 26, which is of tubular design, the securing element 2 being coupled to the axis of rotation D via a connecting tube 20. In order to pivot the displaceable section 26 of the securing element 2, use is made of a drive motor 31 which is arranged centrally between the longitudinal sides 12a, 12b of the seat part 12 and the motor shaft of which uses a toothed belt 316 to drive a toothed wheel 317 which is connected to the connecting tube 20 of the securing element 2, so that, when the drive motor 31 is actuated, the securing element 2 pivots. As an alternative to the toothed belt, the transmission of force by the drive motor 31 can take place, for example, by means of a chain drive or a V-belt.

FIGS. 11a and 11b show the securing element 2 in a state in which the displaceable section 26 thereof has been displaced by pivoting into a position in which it is to prevent the pelvis of a vehicle occupant from slipping under the lap belt in a crash situation. From this position, the securing element 2 can be guided back into its starting position by actuation of the drive motor 31 of the drive device 3 with a corresponding direction of rotation, in which case the connecting tube 20 of the securing element 2 is guided in a longitudinal slot 120 of the seat part 12 and the displaceable section 26 finally enters in its starting position into an associated transverse slot 126 of the seat part 12.

Figure 12:
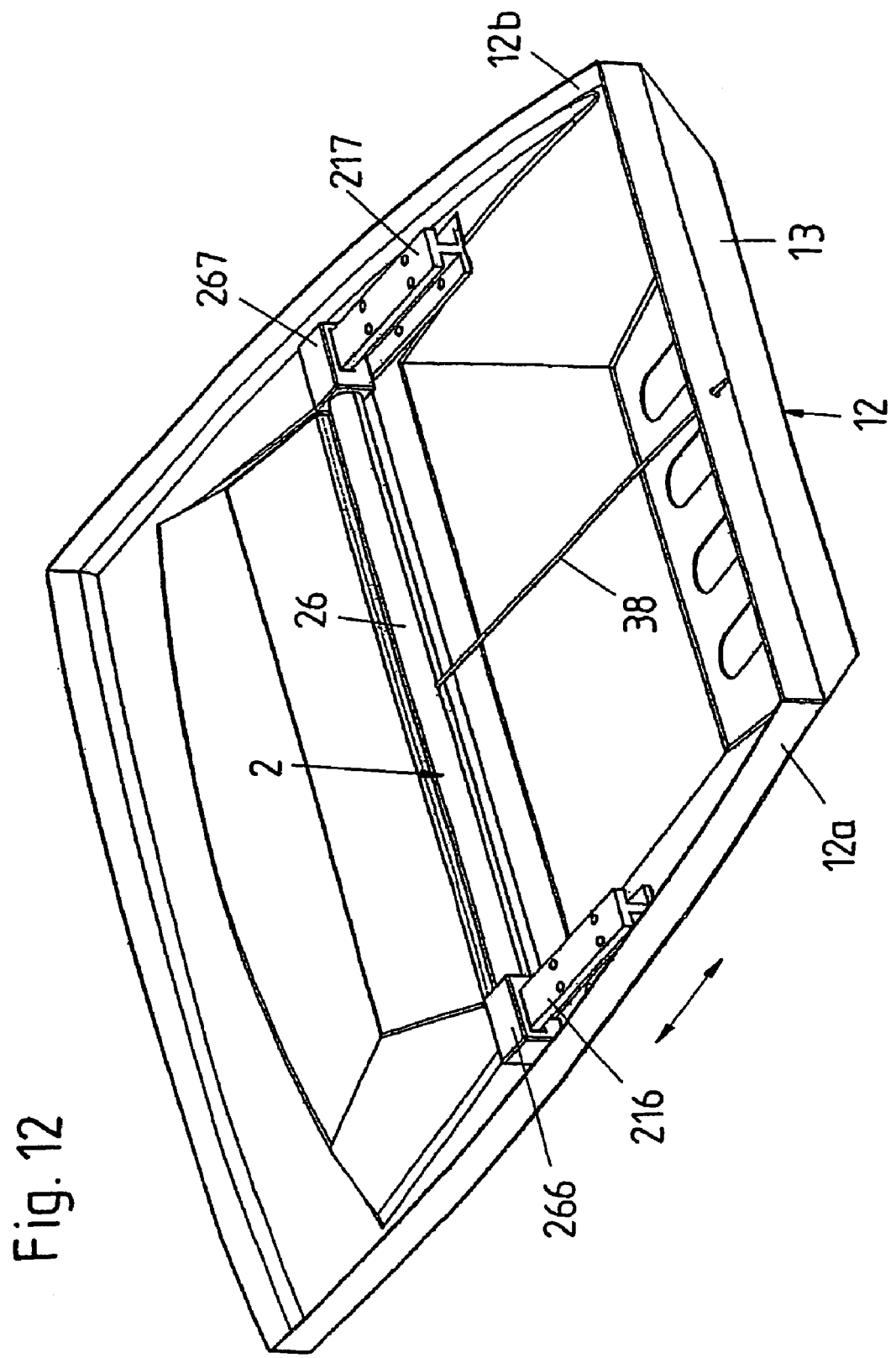
FIG. 12 shows a perspective illustration of a seat part with an embodiment of a securing element adjustable by a drive device.

In the exemplary embodiment illustrated in FIG. 12 without the associated drive motor, the relevant displaceable section 26 of the securing element 2 is moved by a traction mechanism 38 extending centrally between the two longitudinal sides 12a, 12b of the seat part 12, the displaceable section 26 of the securing element 2 being guided by lateral guide elements 266, 267 on a respective guide rail 216 or 217 extending along one of the longitudinal sides 12a, 12b.

FIG. 12 shows the securing element 2 in its starting position from which it can be moved in a crash situation in the longitudinal direction of the seat (along the double arrow illustrated in the figure) by means of an adjusting movement into a forwardly displaced position in which it opposes the slipping of the pelvis of a vehicle occupant under the lap belt.

Different variants are conceivable with regard to the design of the traction mechanism 38: in the case of a revolving traction mechanism, for example in which the two free ends of a traction mechanism are connected in each case to the securing element 2, the return of the traction mechanism takes place by reversing the direction of the rotation of the drive motor with respect to the preceding forward displacement of the traction mechanism. In the case of an elongated traction mechanism 38 which, as illustrated in FIG. 12, is fastened at one end to the relevant displaceable section 26 of the securing element 2 and at the other end to a suitable part of the drive motor (not illustrated), the resetting movement can take place, for example, by means of a spring arrangement. As an alternative, a traction mechanism 38 of this type may also be arranged so that the forward displacement of the securing element 2 in a crash situation takes place by means of a spring arrangement and the resetting movement is undertaken by the traction mechanism coupled to the drive motor.

Figure 13A:
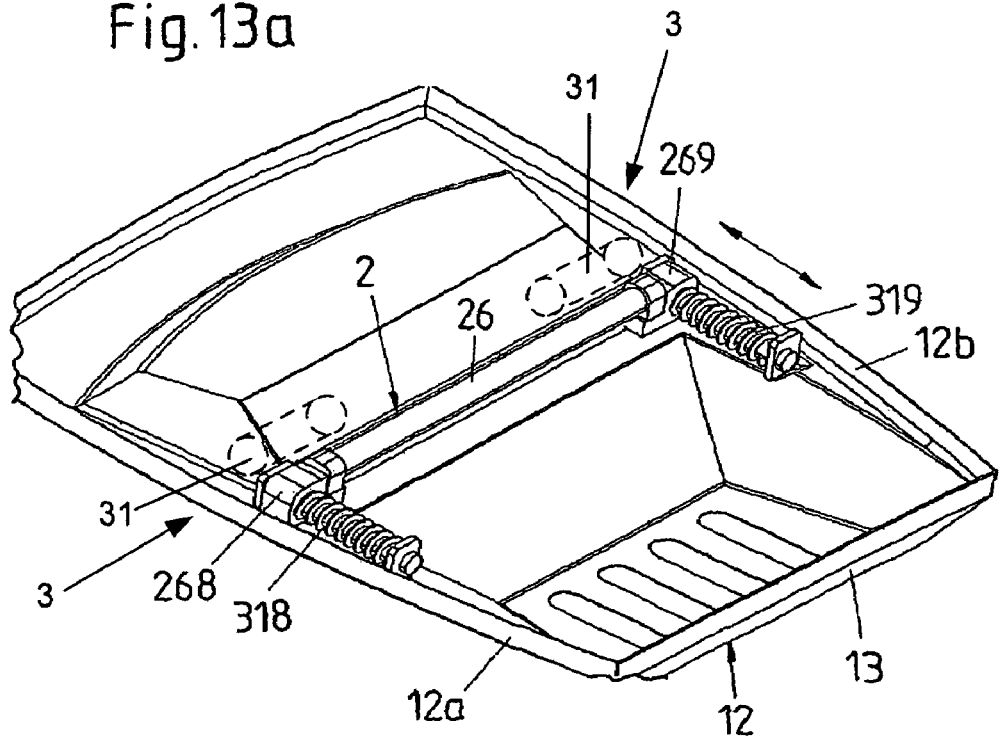
FIG. 13a shows a perspective illustration of a specific embodiment of a securing element adjustable by means of a drive device.
Figure 13B:
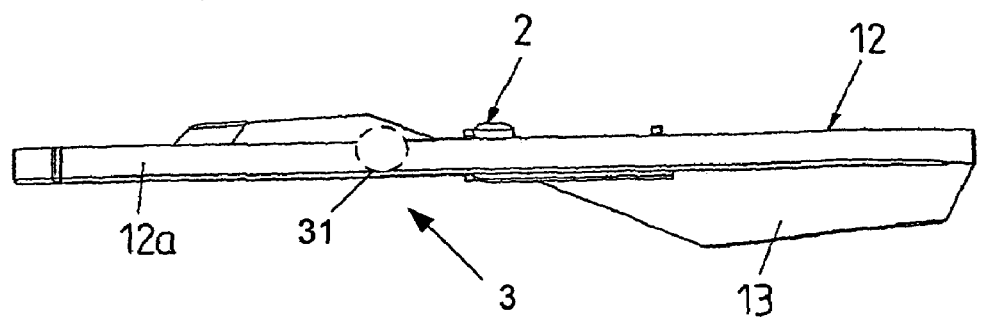
FIG. 13b shows a side view of a specific embodiment of a securing element adjustable by means of a drive device.

In the case of the exemplary embodiment illustrated in FIG. 13a and 13b, the relevant, front displaceable section 26 of the securing element 2, which section extends transversely with respect to the longitudinal direction X of the seat between the two longitudinal sides 12a, 12b of the seat part 12, has in each case at its two outer ends a spindle nut 268, 269 which is mounted in a rotationally fixed and longitudinally displaceable manner on a threaded spindle 318, 319 extended in the longitudinal direction X of the seat. The two threaded spindles 318, 319 extend in each case along one of the two longitudinal sides 12a, 12b of the seat part 12 and are mounted on the seat shell 13. By actuation of a drive motor exemplary drive motors 31 are shown in FIG. 13a and 13b for example purposes only) which is assigned to the threaded spindles 318, 319 and which produces a rotational movement of the threaded spindles 318, 319, a longitudinal movement of the spindle nuts 268, 269 arranged thereon and therefore of the displaceable section 26 of the securing element 2 is brought about. Said securing element can then be moved forward out of the starting position (illustrated in FIG. 13*a* and 13*b*) into a position in which it prevents the slipping through of a vehicle occupant. The return of the displaceable section 26 into the starting position then takes place by reversing the direction of rotation of the drive motor and therefore also of the threaded spindles 318, 319.

In this case, each threaded spindle 318, 319 may either be assigned a dedicated drive motor or use is made of a common motor which is coupled to the particular threaded spindle 318, 319 via suitable mechanism elements (e.g. via a toothed belt).

The priority document, DE 102 31 794.1, filed on Jul. 10, 2002, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety device for a motor vehicle seat, comprising:
   a seat surface extending along a longitudinal direction of the seat;
   a securing element assigned to the seat surface; and
   a drive device operatively connected to the securing element and configured to be activated in a crash situation, in order to move the securing element out of a starting position;
   wherein the securing element is configured to act on the seat surface, without changing the spatial position of the seat surface so that the seat surface and the securing element oppose the forward displacement of an object resting on the seat surface in the longitudinal direction of the seat;
   wherein the drive device includes a mechanism for returning the securing element into the starting position, so that after the securing element is returned into the starting position, a new movement of the securing element in a new crash situation is ensured, and
   wherein the drive device further includes a motor device which, in a crash situation, serves for moving the securing element out of the starting position and/or which serves for returning the securing element into the starting position.

2. The safety device of claim 1, wherein the securing element is arranged below the seat surface and, in a crash situation, is brought closer to the seat surface by means of the drive device.

3. The safety device of claim 1, wherein the drive device has a releasable catch which blocks a return movement of the securing element into the starting position.

4. The safety device of claim 1, wherein the mechanism for returning the securing element into the starting position includes a spring device.

5. The safety device of claim 1, wherein the mechanism for returning the securing element into the starting position includes the motor device.

6. The safety device of claim 1, wherein the drive device has a spring element for moving the securing element in a crash situation.

7. The safety device of claim 5, wherein the motor device serves both for realizing the movement of the securing element in a crash situation and for returning the securing element into the starting position.

8. The safety device of claim 7, wherein the drive device has a strand-shaped traction mechanism that operatively connects the securing element to the motor device.

9. The safety device of claim 8, wherein the traction mechanism is guided by a deflecting element.

10. The safety device of claim 8, wherein the drive device includes a second strand-shaped traction mechanism arranged between the motor device and an end section of a lap belt so that, in a crash situation, the motor device brings about a tensioning of the lap belt toward the seat surface during the movement of the securing element.

11. The safety device of claim 8, wherein the traction mechanism is configured to be wound up by the motor device.

12. The safety device of claim 8, wherein the traction mechanism is configured to be moved in a translatory manner by means of the motor device.

13. The safety device of claim 8, wherein the traction mechanism is fastened by its first end to the securing element and by its second end, via at least one deflecting element, to an end section of a lap belt, which is provided on the motor vehicle seat, so that, in a crash situation, the movement of the securing element simultaneously tensions the lap belt toward the seat surface.

14. The safety device of claim 5, wherein the motor device has a mechanism for the transmission and stepping-up of a force produced by the motor device to the securing element.

15. The safety device of claim 14, wherein the transmission mechanism is a toothed mechanism.

16. The safety device of claim 14, wherein the transmission mechanism is a spindle mechanism.

17. The safety device of claim 14, wherein the transmission mechanism includes a lever arrangement.

18. The safety device of claim 14, wherein the transmission mechanism includes a belt.

19. The safety device of claim 14, wherein the transmission mechanism includes a flexible traction mechanism.

20. The safety device of claim 14, wherein the securing element extends essentially perpendicularly to the longitudinal direction of the seat with a displaceable section below the seat surface.

21. The safety device of claim 14, wherein the securing element is located on a seat shell of the motor vehicle seat.

22. The safety device of claim 1, wherein the securing element can be moved in the direction of the seat surface in a translatory manner in a crash situation.

23. The safety device of claim 1, wherein the securing element can be moved in the direction of the seat surface in a rotary manner in a crash situation.

24. The safety device of claim 1, wherein the securing element can be moved in the direction of the seat surface in a translatory and rotary manner in a crash situation.

25. The safety device of claim 1, wherein the securing element has a displaceable section which opposes the forward displacement of the object resting on the seat surface if the securing element has been moved out of its starting position by the drive device.

26. The safety device of claim 1, wherein the securing element has at least one section for guiding the securing element along the direction of movement.

27. The safety device of claim 1, wherein the securing element is strand-shaped design two end sections.

28. The safety device of claim 27, wherein the end sections of the securing element are arranged in guide structures which are provided on the motor vehicle seat and are intended for a translatory movement of the securing element in a crash situation.

29. The safety device of claim 27, wherein a motor device is arranged on each end section of the securing element.

30. The safety device of one of claim 27, wherein the securing element is bow-shaped with two end sections.

31. The safety device of claim 30, wherein a rectilinear pivoting section extends between the two end sections.

32. The safety device of claim 30, wherein the securing element is coupled pivotably to the vehicle seat by both end sections.

33. The safety device of claim 30, wherein a motor device is arranged in the region of at least one end section of the securing element.

34. The safety device of claim 1, wherein the securing element is plastically deformable so that, in a crash situation, it acts, in interaction with the object resting on the seat surface, as an energy-absorbing element.

35. The safety device of claim 34, wherein the plastic deformation of the securing element in a crash situation takes place essentially along the longitudinal direction of the seat.

36. The safety device of claim 1, wherein the drive device is configured to be activated by signals of a crash sensor in a motor vehicle.

37. The safety device of claim 1, wherein a drive motor of the drive device is arranged centrally between two longitudinal sides of the seat surface.

38. The safety device as claimed claim 1, wherein a drive motor of the drive device is arranged in each case on each longitudinal side of the seat surface.

* * * * *